(12) United States Patent
Nichols et al.

(10) Patent No.: US 8,125,724 B1
(45) Date of Patent: Feb. 28, 2012

(54) PREDICTIVE CHARACTERIZATION OF ADJACENT TRACK ERASURE IN RECORDING MEDIA

(75) Inventors: Mark A. Nichols, San Jose, CA (US); Harold H. Gee, San Jose, CA (US)

(73) Assignee: WD Media, Inc., San Jose, CA (US)

( * ) Notice: Subject to any disclaimer, the term of this patent is extended or adjusted under 35 U.S.C. 154(b) by 69 days.

(21) Appl. No.: 12/722,489

(22) Filed: Mar. 11, 2010

(51) Int. Cl.
G11B 27/36 (2006.01)

(52) U.S. Cl. .......................................... 360/31
(58) Field of Classification Search .......... None
See application file for complete search history.

(56) References Cited

U.S. PATENT DOCUMENTS

| | | | |
|---|---|---|---|
| 5,600,500 A | 2/1997 | Madsen et al. | |
| 5,691,857 A | 11/1997 | Fitzpatrick et al. | |
| 6,877,116 B1 | 4/2005 | Kost et al. | |
| 6,975,475 B2 | 12/2005 | Lee et al. | |
| 7,095,576 B2 | 8/2006 | Kim et al. | |
| 7,170,700 B1 | 1/2007 | Lin et al. | |
| 7,227,708 B2 | 6/2007 | Feng | |
| 7,567,397 B2 | 7/2009 | Lu | |
| 7,706,096 B2 | 4/2010 | Ito et al. | |
| 7,747,907 B2 | 6/2010 | Olds et al. | |
| 2003/0081338 A1 | 5/2003 | Wang et al. | |
| 2011/0075286 A1* | 3/2011 | Duan et al. | 360/31 |

OTHER PUBLICATIONS

Alexander Taratorin, "Characterization of Magnetic Recording Systems: A practical Approach", Guzik Technical Enterprises, ch. 4, 1996.
A. Van Herk, "Side Fringing Fields and Write and Read Crosstalk of Narrow Magnetic Recording Heads", IEEE Transactions on Magnetics, vol. Mag-13, No. 4, pp. 1021-1028, Jul. 1977.
A. Van Herk, et al., "Measurement of Side-Write, -Erase, and -Read Behavior of Conventional Narrow Track Disk Heads", IEEE Transactions on Magnetics, vol. Mag-16, No. 1, pp. 114-119, Jan. 1980.

* cited by examiner

Primary Examiner — Wayne Young
Assistant Examiner — Regina N Holder

(57) ABSTRACT

A wide area track erasure (WATER) rate of change is determined from a model generated from a plurality of track erasure measurements performed on a magnetic recording media. A model of the change in noise amplitude for an off-track position as a function of the number of aggressor track writes employed in the track erasure measurements is generated. In a log-linear space a linear fit of the change in noise amplitude with respect to the number of aggressor track writes yields a rate of noise amplitude change (dB/decade) which may be utilized to rank magnetic recording media.

20 Claims, 7 Drawing Sheets

PREDICTIVE CHARACTERIZATION OF ADJACENT TRACK ERASURE IN RECORDING MEDIA

TECHNICAL FIELD

Embodiments of the invention described herein relate to the field of disk drives and more specifically to wide area track erasure (WATER) in recording media for disk drives.

BACKGROUND

A disk drive is a data storage device that stores data in concentric tracks on a recording media disk. During operation, the disk is rotated about an axis by a spindle motor while a transducer (head) reads/writes data from/to a target track of the disk. A servo controller uses servo data read from the disk to accurately position the head above the target track while the data transfer takes place. Cross-track density is an important characterization of the storage capability for a given disk drive. Cross-track density (e.g., tracks/inch) is a function of head design as well as the physical qualities of the recording media. Adjacent and non-adjacent track erasure, which may limit the cross-track density, occurs when data stored on a first track is corrupted by the writing of data to a second track, proximate to the first track. Bit error rate (BER) and data loss specifications for a disk drive may therefore limit the cross-track density and overall storage capacity of a drive.

Automated testing of a magnetic recording media is performed to characterize how much damage occurs in neighboring tracks when a central track is written. Wide area track erasure (WATER) is one automated test which is conventionally based on either error rate or noise amplitude measured across a wide area after tens of thousands of writes to a particular track (i.e. "aggressor track"). A noise-based WATER test assesses the noise the aggressor track writes induce at an off-track position proximate to the aggressor track. However, performing such a large number of writes takes considerable automated tester time, limiting a tester's throughput and limiting the ability to disposition media disks as the disks are produced from a manufacturing line.

BRIEF DESCRIPTION OF THE DRAWINGS

Embodiments of the present invention is illustrated by way of example, and not limitation, in the figures of the accompanying drawings in which.

DETAILED DESCRIPTION

In the following description, numerous specific details are set forth, such as examples of wide area track erasure (WATER) measurements, to provide a thorough understanding of exemplary embodiments of the present invention. It will be apparent, however, to one skilled in the art that these specific details need not be employed to practice all embodiments of the present invention. Well known components or methods have not been described in detail to avoid unnecessarily obscuring various embodiments of the present invention.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, levels, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "performing," "measuring," "generating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The methods discussed below may be performed by processing logic (e.g., engines and modules) that may comprise hardware (e.g., circuitry, dedicated logic, programmable logic, microcode, etc.), software (such as instructions run on a processing device), firmware, or a combination thereof, as discussed in further detail below.

Figure 1A:
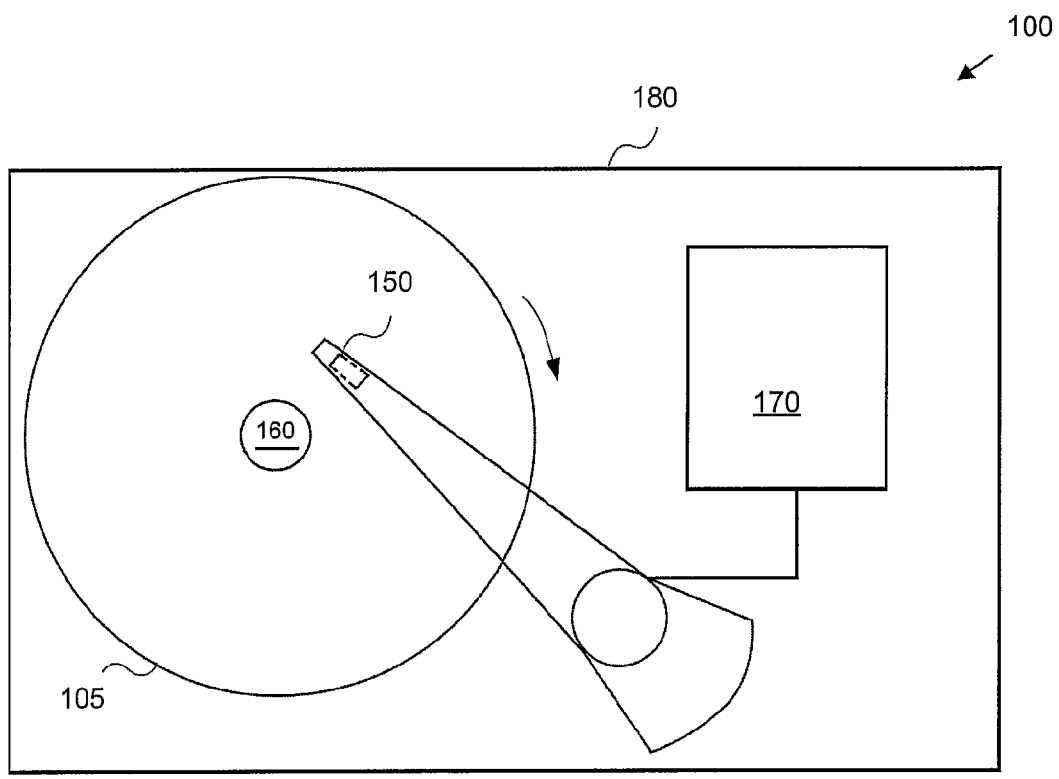
FIG. 1A illustrates a disk drive including a magnetic recording disk, in accordance with an embodiment of the present invention.

FIG. 1A illustrates a disk drive 100 having a disk 105. The disk drive 100 may include one or more disks 105 to store data. The disk 105 resides on a spindle assembly 160 that is mounted to drive housing 180. Data may be stored along tracks in the magnetic recording layer of the disk 105. The reading and writing of data is accomplished with a head 150 that has both read and write elements. The write element is used to alter the properties of magnetic recording layer of disk 105. In one embodiment, the head 150 may have magneto-resistive (MR), or giant magneto-resistive (GMR) elements.

In an alternative embodiment, the head 150 may be another type of head, for example, an inductive read/write head or a Hall Effect head. A spindle motor (not shown) rotates a spindle assembly 160 and, thereby, the disk 105 to position head 150 at a particular location along a desired disk track. The position of the head 150 relative to the disk 105 may be controlled by position control circuitry 170.

Figure 1B:
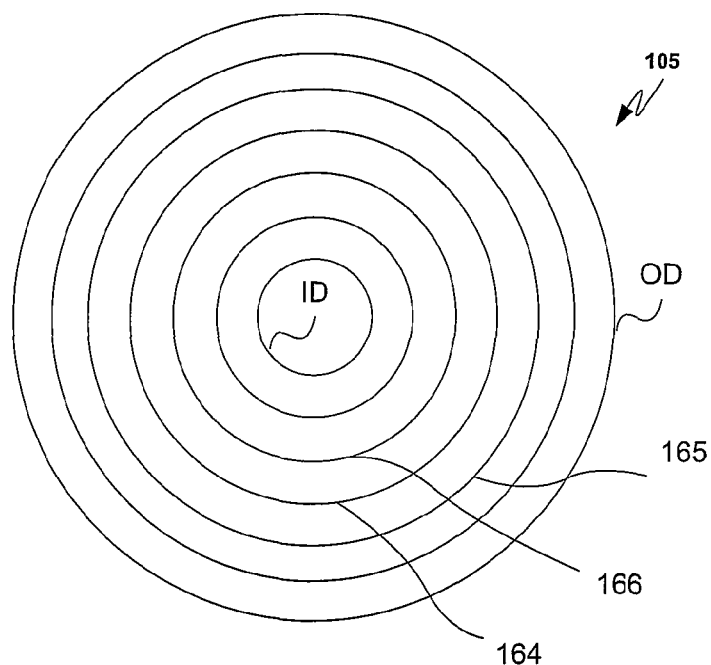
FIG. 1B illustrates a plan view of a recording disk with concentric tracks, in accordance with an embodiment.

FIG. 1B illustrates a plan view of the recording disk 105 with exemplary tracks concentrically arranged between an inner diameter (ID) and an outer diameter (OD) of the disk. An aggressor track 165 is disposed proximate, in a radial direction, to an adjacent side track 164 and disposed further from a non-adjacent side track 166. As such, the radial positions of the adjacent side track 164 and 166 are referenced herein in terms of their "off-track" position relative the aggressor track 165. In the exemplary embodiment depicted, the adjacent side track 164 and non-adjacent side track 166 are both inside the aggressor track 165 (i.e., the off-track positions are proximate to the disk ID). However, adjacent side track and non-adjacent side track positions analogous to those of the tracks 164, 166 may also be present outside of the aggressor track 165 (i.e. off-track positions are proximate to the disk OD). In particular embodiments, multiple writes to the aggressor track 165 are performed while noise at an off-track position proximate to the aggressor track is periodically assessed and associated with a corresponding number of aggressor track writes.

Although the exemplary embodiments described in detail herein entail writing to the aggressor track 165 and measuring the effect on both the adjacent and non-adjacent side track 164, 166, this convention is merely for clarity of description and alternative embodiments include writing to a plurality of aggressor tracks 165 and measuring the effects of on one or more side track positions which may be either adjacent to an aggressor track or non-adjacent to an aggressor track (e.g., distal from the aggressor track). For example, in one such alternative embodiment, a signal is written to a pair aggressor tracks having a center track there between. The center track may either be storing a detectable signal or set to a DC state while side tracks outside of the pair of aggressor tracks are set to a DC state in preparation for a noise amplitude assessment, as described further elsewhere herein.

Figure 1C:
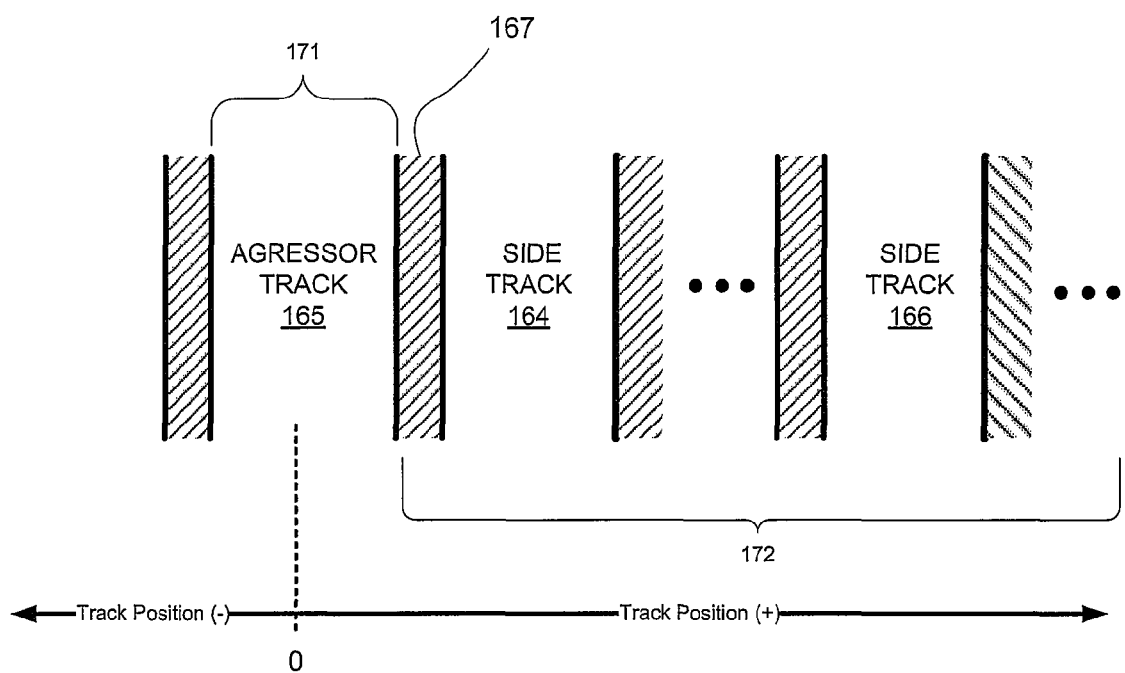
FIG. 1C illustrates an expanded view of wide area track positions along a radial direction of the recording disk, in accordance with an embodiment.

FIG. 1C illustrates an expanded view of cross-track positions including both the aggressor track 165 and a plurality off-track positions 172, in accordance with an embodiment. As shown, the "visible" cross-track width 171 (along a radius of the disk 105) is the recordable portion of the magnetic media associated with the aggressor track 165 and is confined within the "invisible" erase bands 167. Positive and negative track positions are defined relative to the position of the aggressor track 165. The plurality of off-track positions 172 include the adjacent side track 164, the non-adjacent side track 166 and a number of positions there between. As such, the plurality of off-track positions 172 correspond to a wide area over which noise amplitudes are to be measured as writes are performed to the aggressor track 165. In an exemplary embodiment, the plurality of off-track positions 172 spans a width corresponding to approximately 20 tracks. Although the off-track positions 172 correspond to positive track positions, analogous off-track positions may also be measured along the negative track direction for a total off-track width corresponding to approximately 40 tracks for the exemplary WATER tests described herein (unless the aggressor track 165 is positioned at the recording media disk OD). The off-track widths may deviate substantially however without departing from the scope of the inventive subject matter described herein.

Figure 2:
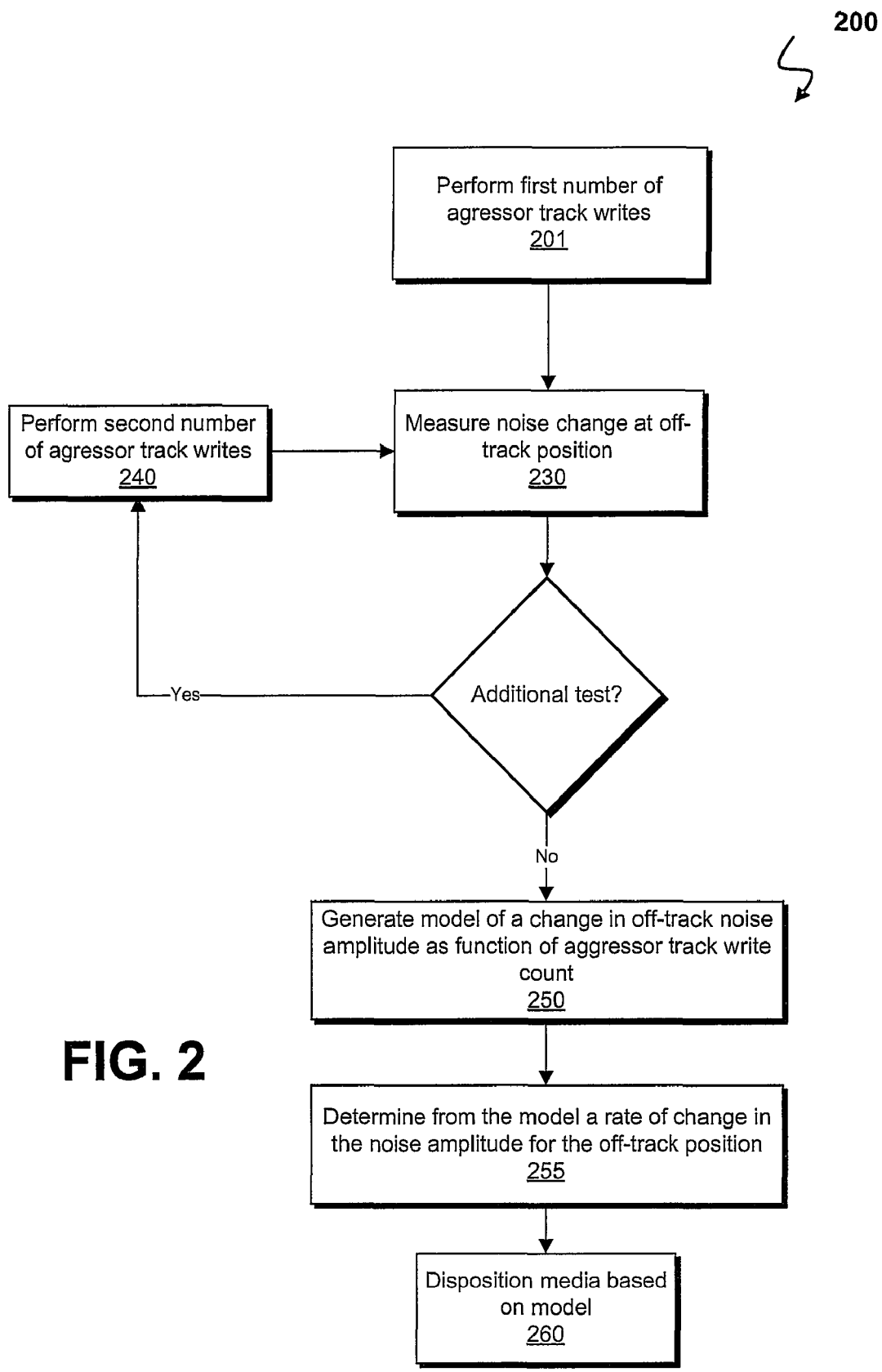
FIG. 2 illustrates a method for generating a model of a rate of change in a noise amplitude for an off-track position as a function of a number of writes to an aggressor track, in accordance with an embodiment of the present invention.

FIG. 2 illustrates a method for generating a model of a rate of change in a noise amplitude for an off-track position as a function of a number of writes to an aggressor track, in accordance with an embodiment of the present invention. Generally, the method 200 performs a plurality of track erasure measurements so that a model of a change in the noise amplitude at an off-track position as a function of the number of aggressor track writes may be generated. As illustrated, at operation 201 one or more aggressor track writes are performed on the aggressor track 165. A change in the noise amplitude attributable to the aggressor track writes is determined at operation 230 for one or more off-track positions (e.g., adjacent track 164 and/or non-adjacent track 166). Additional track erasure tests are performed by performing a second number of aggressor track writes at operation 240 and then repeating the off-track noise amplitude measurement at operation 230. Upon performance of a sufficient number of WATER tests, at operation 250 a model of the change in the off-track noise amplitude for the one or more off-track positions which were measured at operation 230 is generated. The model relates the change in the off-track noise amplitude to the number of aggressor track writes made to the aggressor tack 165 at operations 201 and 240. From this model, a rate of change of the noise amplitude for the off-track position(s) are determined at operation 255. At operation 260, a disposition of the recording media disk is made based on the modeled noise amplitude rate of change. For example, a ranking of a media's WATER performance may be made and the ranking evaluated against a pass/fail threshold for the purposes of quality assurance, process control, etc.

As such, in contrast to a conventional WATER method, the method 200 utilizes a model to derive a noise amplitude rate of change. The method 200 may further utilize the model to predict the noise amplitude change that would result after tens of thousands of writes. For example, a model equation fit to WATER data collected over a first number of writes may be utilized to extrapolate WATER data estimates for a second number of writes, greater than the first number writes. The first number of aggressor track writes may be on the order of 100 to generate such a model.

Figure 3:
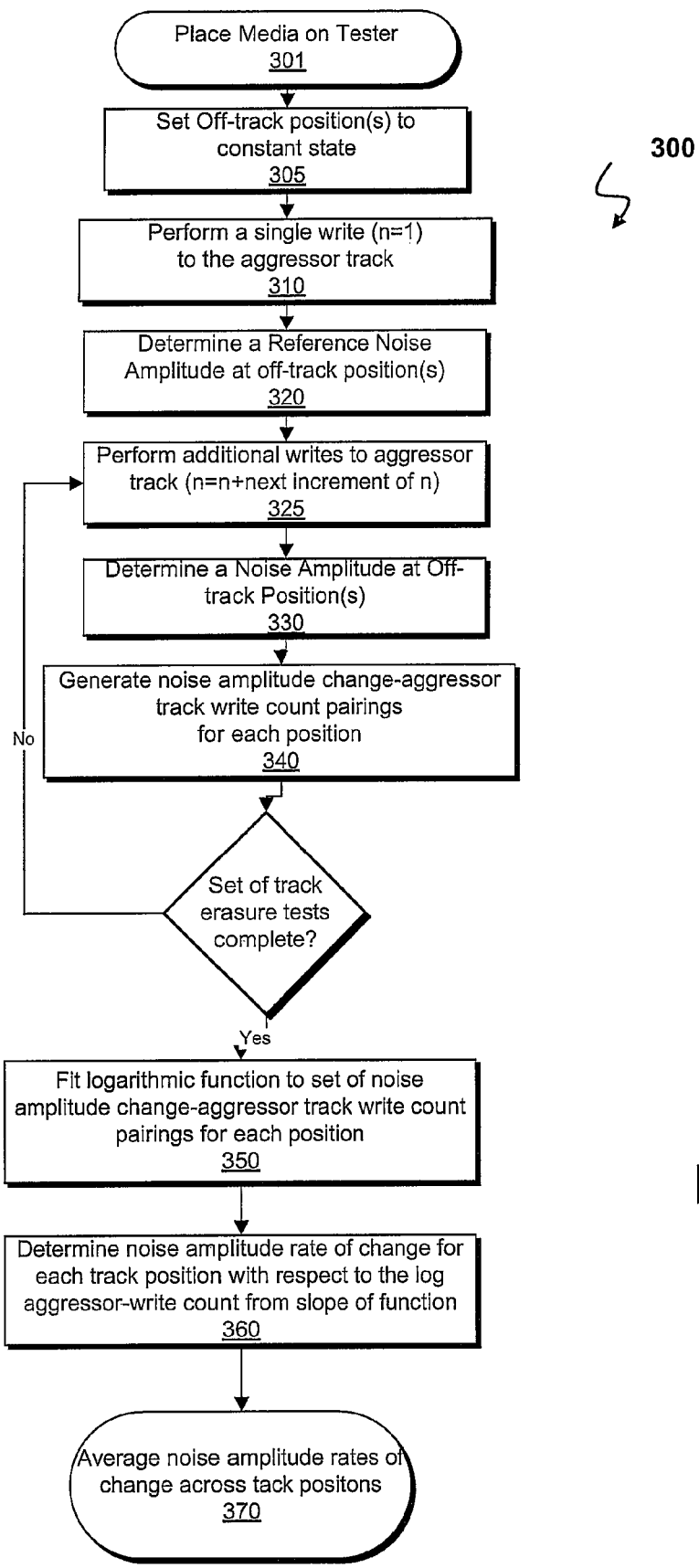
FIG. 3 illustrates a method for determining a noise amplitude rate of change averaged across a plurality of track positions, in accordance with an embodiment of the present invention.

FIG. 3 illustrates a method for determining a noise amplitude rate of change with respect to the aggressor-write count and averaged across a plurality of track positions, in accordance with an embodiment of the present invention. The method 300 exemplifies one particular implementation of the more general method 200. Beginning at operation 301, the recording disk 105 is disposed onto a tester. In the exemplary embodiment, the tester is an automated tester including spinstand. In alternative embodiments however, the method 300 is adapted to a self-test performed on a disk disposed in an assembled drive.

At operation 305, one or more off-track positions are initialized to a constant state (e.g., DC erase). In an exemplary embodiment the plurality of off-track positions 172 including positions corresponding to both the adjacent side track 164 and non-adjacent side track 166 are set to the constant state. At operation 310 a signal is written a first time along at least one sector of the aggressor track 165. In embodiments, the write pattern for the aggressor track 165 may correspond to an aggressive condition with respect to generation of off-track noise (e.g., at a data rate equal to the clock frequency). Any techniques known in the art for writing to the aggressor track may be utilized at operation 310.

At operation 320 the noise amplitude is then measured at the plurality of off-track positions until all off-track positions have been evaluated. Any techniques known in the art for measuring noise at off-track positions may be utilized at operation 320. A reference noise level corresponding to the noise amplitude measured after the first write operation 310 (e.g., write count n=1) is stored to a memory for future use in normalizing subsequently measured changes in the noise amplitude. The noise measurement at operation 320 is repeated as necessary to generate noise amplitude data across a wide cross-track area. For example, after a single write operation 310 a noise reference for each of a plurality of off-track positions is determined at operation 320.

At operation 325 additional writes to the aggressor track are performed. Generally, the aggressor track write count n may be incremented at operation 325 to any value different than a previous write count value so that off-track noise amplitude may be determined for a new number of aggressor track writes. In one embodiment, the aggressor track write count n is incremented to a successive value in a logarithmic progression. For example, the write count n may be incremented so that the cumulative write count n advances by decades (log base 10) or another base (e.g., log base 2, etc.). In one such embodiment, for example the initial write count n=1 performed at operation 310 is incremented to n=10 at operation 325. In a further embodiment, the aggressor track write count values are spaced apart in successive iterations of operation 325 such that a model with good fit over a reasonable range of write count n may be generated. For example, where three WATER measurements are to be performed in method 300, write count n is set to each of 1, 10 and 100.

At operation 330 the noise amplitude at one or more off-track position is re-measured substantially as measured at operation 320. At operation 340 the reference noise level from operation 320 is deducted from the noise amplitude measurement performed at operation 330 to generate a normalized noise amplitude change corresponding to the cumulative aggressor track write count n for the off-track position. In the exemplary embodiment, each of the plurality of off-track positions 172 are evaluated at operation 330 and at operation 340 a plurality of normalized noise amplitude change-aggressor track write count pairings is generated by deducting the reference noise amplitude (n=1) from each of the noise amplitudes in the plurality of noise amplitude-aggressor track write count pairings. Depending on the embodiment, the aggressor write count associated with the first noise amplitude from each of the aggressor track write quantities may also be deducted from all subsequent aggressor track write counts. The operations 325, 330 and 340 may be repeated until a predetermined number of erasure tests have been performed to generate a set of normalized noise amplitude change-aggressor track write count pairings for each of the plurality of off-track positions.

Figure 4:
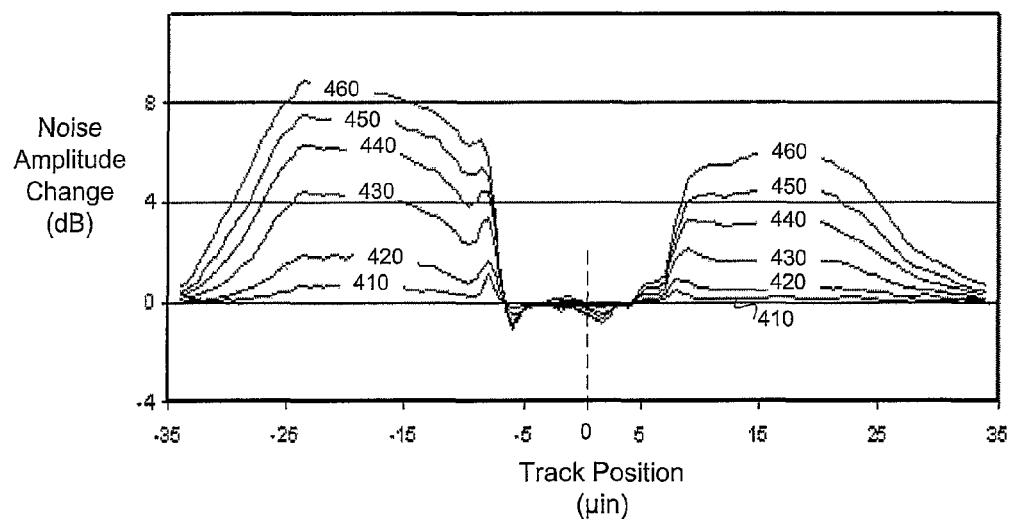
FIG. 4 illustrates a graph of a normalized change in noise amplitude for a plurality of track positions as a function of a number of aggressor track writes, in accordance with an embodiment of the present invention.

FIG. 4 illustrates a graph of a set of normalized noise amplitude changes for a plurality of track positions as a function of a number of aggressor track writes, in accordance with an embodiment of the present invention. In FIG. 4, noise amplitude change in decibels (dB) is plotted along the y-axis for various track positions plotted along the x-axis. The track positions extending between approximately −5 to 5 µin correspond to encompass the aggressor track 165 which is centered at the x-axis zero. These track positions encompassing the aggressor track 165 are excluded from the normalized amplitude change calculations. The positions extending between approximately 5 µin and 35 µin encompass the plurality of off-track positions (e.g., 172 in FIG. 1C). The sets of normalized noise amplitude changes combined across the plurality of track positions from the noise amplitude change curves 410, 420, 430, 440, 450 and 460. Each of the noise amplitude change curves is normalized to the reference noise amplitude determined at operation 320 for the aggressor write count n=1. In the depicted embodiment, the noise amplitude change curve 410 corresponds to an aggressor write count n of 2. Similarly, the curve 420 corresponds to an aggressor write count n equal to 5, the curve 430 corresponds to an aggressor write count n equal 10, and the curves 440, 450 and 460 correspond to aggressor write counts equal to 20, 50 and 100, respectively.

Figure 5A:
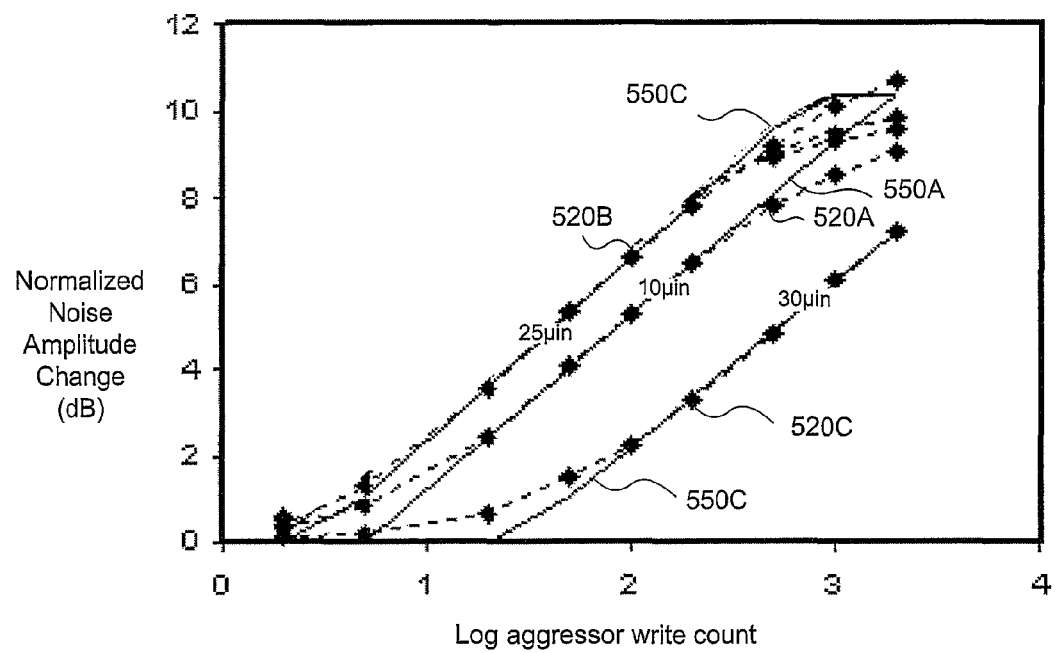
FIG. 5A illustrates a plurality of linear models fit to normalized changes in noise amplitude for a plurality of track positions as a function of a log number of aggressor track writes, in accordance with an embodiment of the present invention.

Returning to FIG. 3, with the set of track erasure tests complete, the method 300 proceeds to operation 350, where a model of the noise amplitude change as a function of write count n is determined based on the plurality of track erasure measurements. The model equation is a function fit to the set of noise amplitude change-aggressor track write count pairings that have been generated. In the exemplary embodiment, the model function is logarithmic with respect to the aggressor track write count. FIG. 5A illustrates the normalized noise amplitude change for a plurality of track positions as a function of a log number of aggressor track writes, in accordance with an embodiment. The data depicted in FIG. 4 is grouped by off-track position. Three sets of normalized noise amplitude change data 520A, 520B and 520C are depicted for three exemplary positions 10 µin, 25 µin and 30 µin, respectively. For the sake of clarity, additional sets of normalized noise amplitude change data are omitted from FIG. 5A. As illustrated, for each off-track position, the noise amplitude change in dB with respect to the log of aggressor write count n is linear over a span of the log number of aggressor writes. When plotted in this manner, it can seen that the noise level at each off-track position changes approximately logarithmically over at least a portion of a number of aggressor track writes performed. A plurality of model equation fittings 550A, 550B and 550C for the three sets of noise amplitude change data is further depicted in FIG. 5A.

Returning to FIG. 3, at operation 360, the model equation derived from the plurality of track erasure measurements is evaluated to extract a slope of the model equation along the linear region depicted in FIG. 5A (e.g., region between 1 and 2 log unit for 550A and between 2 and 3 log unit for 550C). This slope of the noise amplitude change against log number of writes corresponds to a noise amplitude rate of change with respect to the log of the aggressor write count n with units in dB/decade. In a particular embodiment, the slope for each of a plurality of off-track positions is determined at operation 360. As depicted in FIG. 5A, the slopes of the fit lines are approximately equal. The noise amplitude rates of change are then averaged across the plurality of off-track positions at operation 370 to arrive at an average noise amplitude rate of change metric characterizing the magnetic recording media disk.

Figure 5B:
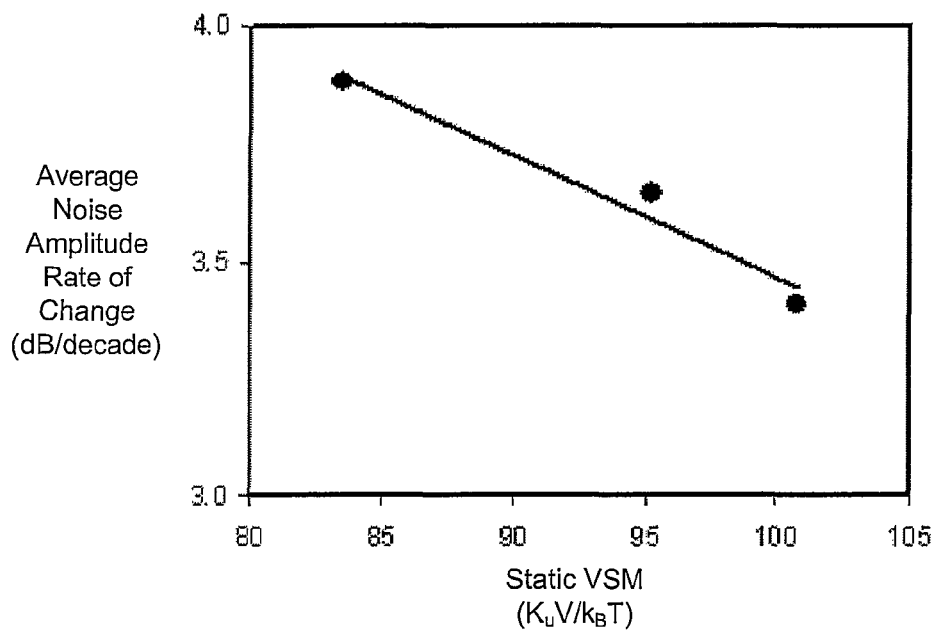
FIG. 5B illustrates a graph of an average noise amplitude rate of change with respect to a static vibrating sample magnetometer (VSM) measurement.

FIG. 5B illustrates a graph of an average noise amplitude rate of change for a each of three different magnetic recording media disks plotted with respect to a static vibrating sample magnetometer (VSM) measurements (in units of $K_u V/k_B T$, where Ku is the magnetic anisotropy constant, V is the magnetic switching volume, $k_B$ is the Boltzmann constant and T is temperature) for that same media. As illustrated, the average noise amplitude rate of change (dB/decade) determined from the method 300 displays good correlation with the VSM measurement data. In a further embodiment, a correlation factor is applied to the slope of the logarithmic function of noise amplitude change (or average of slopes across multiple cross-track positions) to relate the noise amplitude rate of change metric to a static vibrating sample magnetometer (VSM) measurement.

Upon determining a proper correlation factor, the method 300 may be performed in an automated fashion, for example by an automated tester to provide a characterization of track erasure rate of change from which media may be ranked as described in the context of method 200. Time consuming conventional WATER tests (e.g., 100,000 writes, etc.) and destructive VSM measurements may then avoided via a predictive model generated from an number of writes/noise measurements that is much less than is required for the conventional WATER tests. Indeed, the methods described herein may take an order of magnitude less time than alternative methods known in the art. In certain embodiments, the methods described herein are adapted to media disk process development and/or disk manufacturing quality control to improve or sustain a disk's side track erasure performance. For example, every media disk manufactured may be characterized by the method 300 to ensure the capability of the media meets specifications.

Embodiments of the present invention include apparatuses for performing the algorithms described herein. The algorithms of the present invention may be implemented on a stand-alone or networked computer system based on a number of instructions that are executed by the computer(s) to estimate a cross-track density capability of a recording media. The algorithms of the present invention may alternatively be hardcoded into microcode, using FPGAs, for example.

Figure 6:
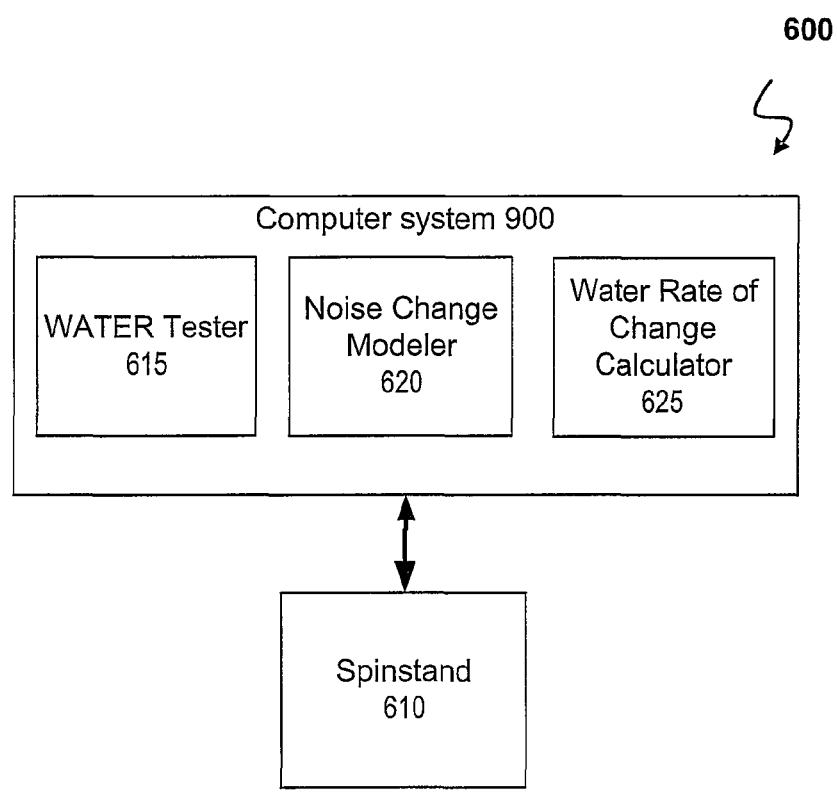
FIG. 6 illustrates a block diagram of an automated tester for determining an average noise amplitude rate of change of a recording media, in accordance with an embodiment of the invention.

An apparatus may be specially constructed for the desired purposes, such as a spinstand computerized controller included in an automated tester. FIG. 6 illustrates a block diagram of an automated tester 600 for determining a WATER rate of change in accordance with an embodiment of the invention. As depicted, the automated tester 600 includes a spinstand 610, such as one commercially available from Guzik Technical Enterprises of Mountain View, Calif. The spinstand 610 is communicatively coupled to a computer system 900 and configured to be controlled by the computer system 900. The computer system 900 is generally further configured to perform any of the algorithms or method described herein.

In the exemplary embodiment depicted, the computer system 900 includes a WATER tester 615, which may be implemented in either software, hardware, or a combination of both to perform the plurality of side track erasure measurements on a disk disposed on the spinstand 610. In a particular embodiment, the WATER tester 615 is to perform a plurality of periodic noise measurements at off track positions as an aggressor track is written multiple times. As further depicted, the computer system 900 includes a noise change modeler 620, which may be implemented in either software, hardware, or a combination of both to generate at least one model of the change in noise amplitude as a function of the log number of aggressor track writes based on the plurality of side track erasure measurements performed by the WATER tester 615. The computer system 900 further includes a WATER rate of change calculator 625, which may be implemented in either software, hardware, or a combination of both to generate a noise amplitude rate of change metric from a slope of the noise amplitude change model equation. In further embodiments where the noise change modeler 620 generates a plurality of models, each of the plurality corresponding to a particular off-track position, the water rate of change calculator 625 extracts a slope from each linear portion of the log-linear model generated and determines an average noise amplitude rate of change metric for a magnetic recording media.

The components 615, 620 and 625 described herein can be implemented as discrete hardware components or integrated in the functionality of hardware components such as ASICS, FPGAs, DSPs or similar devices. In addition, the components 615, 620 and 625 can also be implemented as firmware, or functional circuitry within hardware devices, and software. Further, the components 615, 620 and 625 can be implemented in any combination hardware and software components of computer system 900.

The computer system 900 may further include a general purpose computing device which may be selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The present invention may be provided as a computer program product, or software, that may include a machine-readable medium having stored thereon instructions, which may be used to program a computer system (or other electronic devices) to perform an algorithm according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 7:
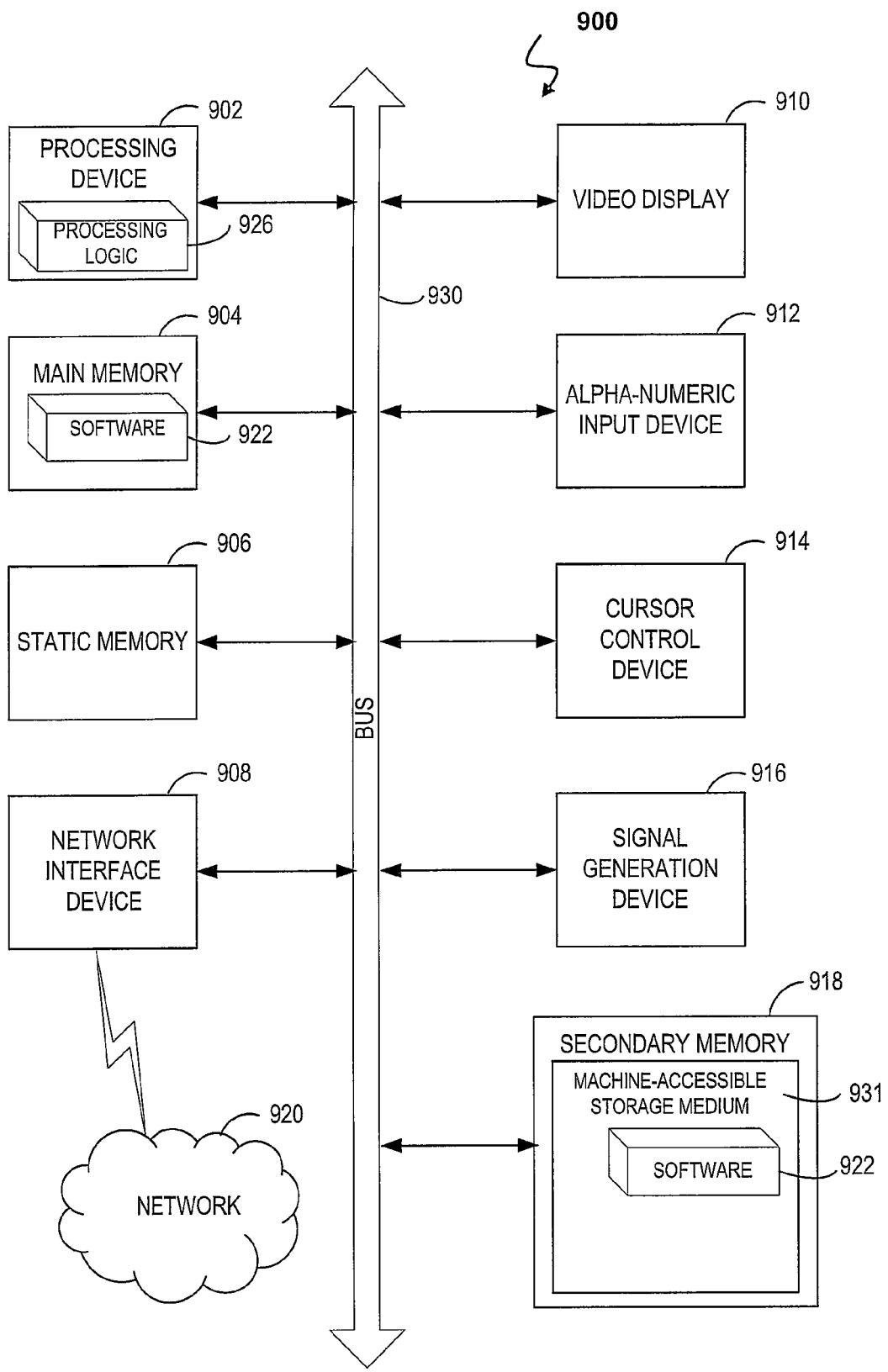
FIG. 7 illustrates a block diagram of an exemplary computer system used to practice embodiments of the present invention.

FIG. 7 illustrates a diagrammatic representation of a machine in the exemplary form of the computer system 900 within which a set of instructions, for causing the machine to perform any one or more of the MTW measurement and modeling methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

The machine-accessible storage medium 931 may store sets of instructions (e.g., software 922) embodying any one or more of the methodologies or functions described herein. While the machine-accessible storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for characterizing wide area track erasure (WATER) in a magnetic recording media, the method comprising:
performing, by a tester, a plurality of track erasure tests on the media, wherein each test of the plurality is associated with a number of aggressor track writes to an aggressor track that induces noise at an off-track position proximate to the aggressor track, wherein the number of aggressor track writes is different for each test, and wherein an amplitude of the noise corresponding to the number of aggressor track writes is associated with each test;
generating a model characterizing a change in the noise amplitude as a function of the number of aggressor track writes based on the plurality of track erasure tests; and
determining, from the model, a rate of change in the noise amplitude with respect to the number of aggressor track writes.

2. The method of claim 1, wherein the change in the noise amplitude is modeled as a function of a log number of aggressor track writes.

3. The method of claim 2, wherein determining the rate of change further comprises extracting a slope of the function.

4. The method as in claim 1, wherein performing the plurality of track erasure tests further comprises:
setting an area of the media to a constant state, the area including the off-track position;
assessing a first noise amplitude at the off-track position after performing a first number of the aggressor track writes;
assessing a second noise amplitude at the off-track position after performing a second number of aggressor track writes; and
generating a set of noise amplitude-aggressor track write count pairings for the off-track position, wherein a first of the pairings associates the first noise amplitude with the first number of aggressor track writes and a second of the pairings associates the second noise amplitude with the second number of aggressor track writes.

5. The method as in claim 4, wherein each of the plurality of track erasure tests is performed at a plurality of off-track positions with the noise amplitude assessed at each of the plurality of off-track positions, and wherein a set of noise amplitude-aggressor track write count pairings are generated for each of the plurality of off-track positions.

6. The method as in claim 4, wherein generating the model further comprises:
generating a set of normalized noise amplitude change-aggressor track write count pairings by deducting a first noise amplitude from each of the first and second noise amplitudes; and
fitting a logarithmic function of the set of normalized noise amplitude change-aggressor track write count pairings.

7. The method as in claim 6, wherein fitting the logarithmic function further comprises taking a linear fit of the normalized noise amplitude change plotted as a function of a log number of aggressor track writes; and
wherein determining the rate of change in the noise amplitude further comprises determining a slope of the linear fit.

8. The method as in claim 6, wherein each of the plurality of track erasure tests is performed at a plurality of off-track positions with the noise amplitude assessed at each of the plurality of off-track positions,
wherein the set of normalized amplitude-aggressor track write count pairings is generated for each of the plurality of off-track positions,
wherein a log function is fit to each set of normalized noise amplitude change-aggressor track write count pairings,
wherein the rate of change in the noise amplitude for each of the plurality of off-track positions with respect to the number of aggressor track writes is determined from a slope of each of the log functions, and
wherein the method further comprises averaging the slopes to generate a WATER rate of change metric for the magnetic recording media.

9. The method as in claim 1, further comprising:
ranking the magnetic recording media based on the noise amplitude rate of change.

10. A computer readable non-transitory storage medium with instructions stored thereon, which when executed by a computer system, cause the computer system to perform the method of claim 1.

11. The computer readable medium of claim 10, further comprising instructions for:
   setting an area of the media to a constant state, the area including the off-track position;
   assessing a first noise amplitude at the off-track position after performing a first number of the aggressor track writes;
   assessing a second noise amplitude at the off-track position after performing a second number of aggressor track writes; and
   generating a set of noise amplitude-aggressor track write count pairings for the off-track position, wherein a first of the pairings associates the first noise amplitude with the first number of aggressor track writes and a second of the pairings associates the second noise amplitude with the second number of aggressor track writes.

12. The computer readable media of claim 11, further comprising instructions for:
   generating a set of normalized noise amplitude change-aggressor track write count pairings by deducting a first noise amplitude from each of the first and second noise amplitudes; and
   fitting a logarithmic function of the set of normalized noise amplitude change-aggressor track write count pairings.

13. An automated tester for characterizing wide area track erasure (WATER) in a magnetic recording media, the automated tester comprising:
   means for performing a plurality of track erasure tests on the media, wherein each test of the plurality is associated with a number of aggressor track writes to an aggressor track that induces noise at an off-track position proximate to the aggressor track, wherein the number of aggressor track writes is different for each test, and wherein an amplitude of the noise corresponding to the number of aggressor track writes is associated with each test;
   means for generating a model characterizing a change in a noise amplitude at the off-track position as a function of the number of aggressor track writes based on the plurality of track erasure tests; and
   means for determining, from the model, a rate of change in the noise amplitude with respect to the aggressor-write count.

14. The automated tester of claim 13, further comprising:
   means for setting an area of the media to a constant state, the area including the off-track position;
   means for assessing a first noise amplitude at the off-track position after performing a first number of the aggressor track writes;
   means for assessing a second noise amplitude at the off-track position after performing a second number of aggressor track writes; and
   means for generating a set of noise amplitude-aggressor track write count pairings for the off-track position, wherein a first of the pairings associates the first noise amplitude with the first number of aggressor track writes and a second of the pairings associates the second noise amplitude with the second number of aggressor track writes.

15. The automated tester of claim 14, further comprising:
   means for generating a set of normalized noise amplitude change-aggressor track write count pairings by deducting a first noise amplitude from each of the first and second noise amplitudes; and
   means for fitting a logarithmic function of the set of normalized noise amplitude change-aggressor track write count pairings.

16. An automated tester for characterizing adjacent track erasure of a recording media, the automated tester comprising:
   a spinstand;
   a wide area track erasure (WATER) tester to perform a plurality of track erasure tests on a recording media disposed on the spinstand, wherein each test of the plurality is associated with a number of aggressor track writes to an aggressor track that induces noise at an off-track position proximate to the aggressor track, wherein the number of aggressor track writes is different for each test, and wherein an amplitude of the off-track noise corresponding to the number of aggressor track writes is associated with each test;
   a noise change modeler to generate a model characterizing a change in the off-track noise amplitude as a function of the number of aggressor track writes based on the plurality of track erasure tests; and
   a WATER rate of change calculator to determine from the model a rate of change in the off-track noise amplitude with respect to the number of aggressor track writes.

17. The automated tester of claim 16, wherein the noise change modeler is to model the off-track noise amplitude change as a logarithmic function of the number of aggressor track writes.

18. The automated tester of claim 17, wherein the threshold number of aggressor track writes is larger than a sum of the aggressor track writes preformed during the plurality of track erasure measurements.

19. The automated tester of claim 18, wherein the WATER tester further comprises:
   a write head to set an area of the media to a constant state, the area including the off-track position;
   a sensor to assess a first noise amplitude at the off-track position after performing a first number of the aggressor track writes and to assess a second noise amplitude at the off-track position after performing a second number of aggressor track writes;
   a memory to store a set of noise amplitude-aggressor track write count pairings for the off-track position, wherein a first of the pairings associates the first noise amplitude with the first number of aggressor track writes and a second of the pairings associates the second noise amplitude with the second number of aggressor track writes.

20. The automated tester of claim 19, further comprising a processing device to generate a set of normalized amplitude change-aggressor track write count pairings by deducting a first noise amplitude from each of the first and second noise amplitudes, to fit a logarithmic function of the set of normalized noise amplitude change-aggressor track write count pairings, and to determine a slope of the logarithmic function.

* * * * *